United States Patent [19]

Kogel

[11] 3,745,783

[45] July 17, 1973

[54] APPARATUS FOR DEFROSTING COOLING UNITS OF ABSORPTION REFRIGERATION SYSTEMS

[75] Inventor: Wilhelm Georg Kogel, Lidingo, Sweden

[73] Assignee: Aktiebolaget Electrolux, Stockholm, Sweden

[22] Filed: Oct. 6, 1971

[21] Appl. No.: 187,079

[30] Foreign Application Priority Data
Oct. 8, 1970  Sweden..................13625/70

[52] U.S. Cl.................... 62/278, 62/490, 62/496
[51] Int. Cl............................................. F25b 15/10
[58] Field of Search................. 62/81, 110, 278, 62/490, 495, 496

[56] References Cited
UNITED STATES PATENTS

| | | | |
|---|---|---|---|
| 2,285,884 | 6/1942 | Ashby | 62/495 |
| 2,468,104 | 4/1949 | Phillips | 62/110 X |
| 2,881,598 | 4/1959 | Hellstrom | 62/490 X |
| 2,956,415 | 10/1960 | Kogel | 62/81 |
| 3,163,997 | 1/1965 | Stierlin | 62/81 X |
| 3,277,665 | 10/1966 | Batson | 62/81 X |
| 3,338,062 | 8/1967 | Kogel | 62/490 X |
| 3,580,004 | 5/1971 | Kogel | 62/490 X |

*Primary Examiner*—William F. O'Dea
*Assistant Examiner*—Peter D. Ferguson
*Attorney*—Edmund A. Fenander

[57] ABSTRACT

In an hermetically sealed absorption refrigeration system employing an inert gas, refrigerant vapor expelled from solution in a generator by heating is liquefied in a condenser which flows therefrom to an evaporator to produce useful refrigeration. Frost accumulating on the evaporator is melted by such expelled vapor which is at an elevated temperature and flows directly to the evaporator in a by-pass line without passing through the condenser. The by-pass line has a trap in which liquid is collected to prevent flow of refrigerant vapor directly to the evaporator and from which trap liquid is removed from time to time to defrost the evaporator.

During operation of the refrigeration system the generator is heated intermittently and the system cycles between "on" or active periods and "off" or inactive periods. An important feature of the invention resides in making use of the cycling of the refrigeration system to automatically start defrosting each time an "on" or active period commences following an "off" or inactive period and to automatically terminate such defrosting after an interval of time.

10 Claims, 1 Drawing Figure

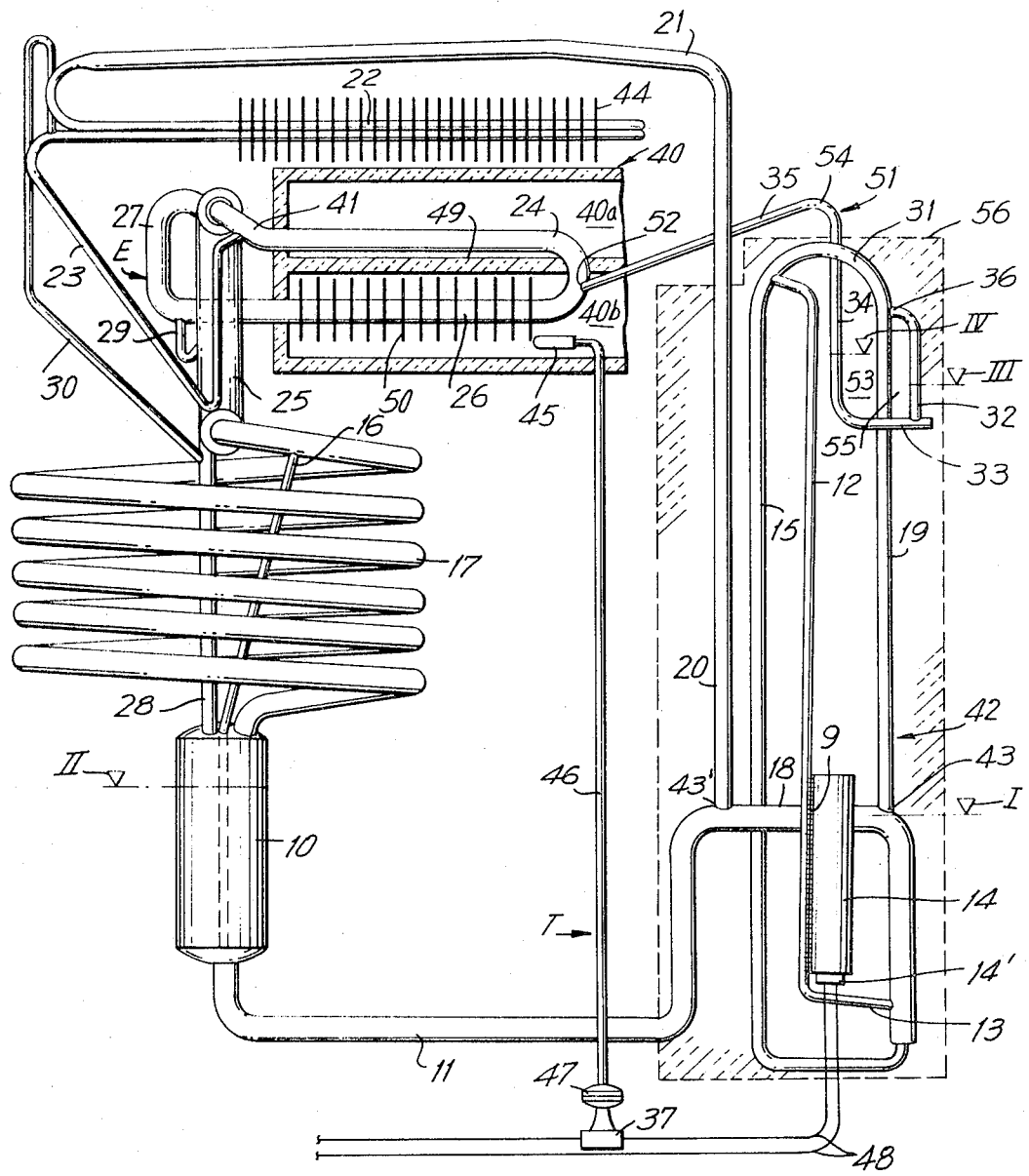

3,745,783

APPARATUS FOR DEFROSTING COOLING UNITS OF ABSORPTION REFRIGERATION SYSTEMS

BACKGROUND OF THE INVENTION

1. Field of the Invention

In hermetically sealed absorption refrigeration systems employing inert gas, refrigerant vapor expelled by heating in a generator is liquefied in a condenser and condensed refrigerant flows to an evaporator to evaporate in the presence of the inert gas to produce useful refrigeration. Such expelled vapor, which is at an elevated temperature, is conducted from time to time to the evaporator in a path of flow which by-passes the condenser, whereby the expelled vapor melts the frost formed on the evaporator.

2. Description of the Prior Art

It has been proposed heretofore to conduct expelled vapor at an elevated temperature to the evaporator in a line which by-passes the condenser and has a trap in which liquid collects to block flow of expelled vapor therethrough and from which liquid is removed from time to time by heating to open the by-pass line and initiate defrosting. Such removal of heat is effected either by bodily removing liquid from the trap or by evaporating the liquid and actuating a heater by a time switch. Defrosting is not self-starting with this prior art proposal which is objectionable. Further, the time switch not only is costly but requires manual adjustment which often necessitates servicing in the field which also is objectionable.

It also has been proposed heretofore to employ a by-pass line having a trap arranged to collect liquid resulting from condensation of expelled refrigerant vapor in accordance with the so-called "cold wall" principle. Defrosting is effected during the interval of time it takes for a definite quantity of liquid to collect in the trap. When this occurs defrosting stops and defrosting is again initiated after sufficient liquid continues to collect in the trap whereby all of the liquid can be removed therefrom by siphon action. This prior art proposal operates in such manner that the intervals of time between defrosting periods are long which is objectionable. Also, when defrosting does commence, the quantity of heat required to melt the frost formed on the evaporator is great. These factors make this prior art arrangement sensitive to manufacturing tolerances. In some instances more heat is supplied to the evaporator by the expelled vapor than is actually required for defrosting for the reason that the capacity of this prior art arrangement must be adequate to defrost even under adverse operating conditions. This often produces an excessive rise in temperature of the space cooled by the evaporator which is objectionable.

SUMMARY OF THE INVENTION

It is an object of my invention to provide an improvement for automatically initiating and terminating defrosting of an evaporator of an absorption refrigerator of the inert gas type, whereby defrosting periods occur frequently and frost formed on the evaporator can be melted during each defrosting period by a relatively small quantity of heat. I accomplish this by making use of the cycling of the refrigeration system during operation thereof to initiate defrosting automatically each time an active or "on" period commences following an inactive or "off" period and to automatically terminate such defrosting after an interval of time.

When an active or "on" period commences the liquid trap is depleted of liquid and open. Refrigerant vapor expelled from solution in the generator or vapor expulsion unit and at an elevated temperature can pass through the trap and flow through the by-pass line to the evaporator to melt frost formed thereon. Since the trap is open there is no resistance to flow of vapor therethrough and all of the expelled vapor flows through the by-pass line. Under these conditions expelled refrigerant vapor will not flow through a vapor line to the condenser, and, after being condensed therein, flow to the evaporator. This is so because the refrigerant vapor flowing in the vapor line must pass through a liquid head in a place, such as an analyzer, for example, which functions as a liquid seal and offers some resistance to flow of expelled vapor in the vapor line.

During the interval of time refrigerant vapor flows through the by-pass line to melt frost formed on the evaporator, the trap collects liquid resulting from condensation of expelled vapor in accordance with the so-called "cold wall" principle. When sufficient liquid collects in the trap the flow of vapor through the by-pass line stops and defrosting of the evaporator automatically terminates. The trap now is closed by liquid which offers substantial resistance to flow of vapor therethrough. This resistance is greater than the resistance to flow of vapor by the liquid head in the aforementioned place in the vapor line, such as the analyzer, and refrigerant vapor now can flow through the vapor line to the condenser and condensed refrigerant will flow from the condenser to the evaporator to produce useful refrigeration.

During an active or "on" period in the operation of the refrigeration system the liquid collected in the trap of the by-pass line remains therein, the liquid columns in the two arms of the trap respectively being acted upon by the pressures prevailing in the vapor space of the generator or vapor expulsion unit and in the evaporator which forms a part of the inert gas circuit. Under these conditions the pressure in the vapor space is higher than that in the evaporator and the liquid remains in the two arms of the trap. This difference in pressure corresponds to the difference in liquid level in an absorber vessel in the absorption solution circuit and the liquid level in that part of the circuit at which the vapor line is in communication with the aforementioned place, such as the analyzer.

When the refrigeration system cycles and shifts from an active or "on" period to an inactive or "off" period, as by the action of a thermostatic control, the supply of heat to the generator is reduced or shut off and the generator temperature falls which causes the pressure in the vapor space to fall. However, the temperature and pressure in the inert gas circuit, of which the evaporator forms a part, does not change to any significant extent. This pressure differential forces liquid from the trap into the parts of the generator or vapor expulsion unit defining the vapor space and opens the trap. When an active or "on" period of the refrigeration system again is initiated, as by the action of the thermostatic control, expelled vapor can flow through the by-pass line to melt frost formed on the evaporator.

BRIEF DESCRIPTION OF THE DRAWING

In the Drawing the single FIGURE diagrammatically illustrates an absorption refrigeration system of the inert gas type embodying my invention.

DESCRIPTION OF THE PREFERRED EMBODIMENT

Referring to the drawing I have shown my invention in connection with an hermetically sealed absorption refrigeration system of a uniform pressure type in which an auxiliary pressure equalizing gas is employed. Air-cooled systems of this type are well known and include a cooling unit or evaporator E which is arranged to abstract heat from the thermally insulated interior of a refrigerator cabinet 40. Refrigerant fluid, such as ammonia, passes through a conduit 23 into the evaporator E and evaporates and diffuses therein into an inert gas, such as hydrogen, to produce a refrigerating effect. The resulting gas mixture of refrigerant and inert gas flows from evaporator E through a conduit 27, an outer passage of gas heat exchanger 25 and vertically extending conduit 28 into an air-cooled absorber comprising an absorber vessel 10 and an absorber coil 17.

In the absorber refrigerant vapor is absorbed by a suitable absorbent, such as water, for example, which is introduced into coil 17 through a conduit 16. The hydrogen or inert gas, which is practically insoluble and weak in refrigerant, is returned to evaporator E through an inner passage of gas heat exchanger 25 and a conduit 41.

Since the column of gas rich in refrigerant vapor and flowing from the evaporator E to the absorber coil 17 is heavier than the column of gas weak in refrigerant and flowing from the coil to evaporator E, a force is produced within the system for causing circulation of inert gas in the manner described. This is due to the difference in specific weight of the aforementioned columns of gas rich and weak, respectively, in refrigerant vapor.

Enriched absorption liquid, which also is referred to as absorption solution, is conducted from the vessel 10 through an outer passage of an elongated liquid heat exchanger 11 into a conduit 13 connected to the lower end of a vapor-liquid lift pump 12 of a generator or vapor expulsion unit 42. The generator comprises a heating tube 14 having the vapor-liquid lift pump 12 in thermal exchange relation therewith at 9, as by welding, for example. By heating the generator, as by an electrical heating element 14', for example, liquid from the liquid heat exchanger 11 is raised by vapor-liquid lift action through pump 12 into the upper part of standpipe 15. The liberated lifting vapor entering standpipe 15 flows through a vapor space 31 of the standpipe and a vapor conduit 19 which extends downward and is connected at 43 to an elevated horizontal part 18 of the liquid heat exchanger 11 which is at the level I.

The vapor from conduit 19 passes in a horizontally extending direction in intimate physical contact with absorption solution enriched in refrigerant which is flowing through the outer passage of the liquid heat exchanger 11. The part 18 of the liquid heat exchanger 11 forms an analyzer in which water vapor accompanying refrigerant vapor is removed from the latter by condensation. The vapor passes upward from the horizontal part 18 of the liquid heat exchanger 11 at 43' into a conduit 20 which may be referred to as a part of the vapor line being described and is connected to a rectifier 21 in which condensation of absorption liquid vapor accompanying refrigerant vapor also is effected. Refrigerant vapor flows from rectifier 21 into an air-cooled condenser 22 having heat dissipating surfaces or heat transfer fins 44. Refrigerant vapor is liquefied in the condenser 22 and liquefied refrigerant is returned to evaporator E through the conduit 23 to complete the refrigerating cycle.

Liquid refrigerant flows by gravity in the evaporator E, the refrigerant flowing in parallel flow with the inert gas in a low temperature section 24 and in a higher temperature section 26 of the evaporator E. The weakened absorption solution, from which refrigerant has been expelled, is conducted from standpipe 15, inner passage of liquid heat exchanger 11 and conduit 16 into the upper part of the absorber coil 17. Circulation of absorption solution in the manner just described is effected by raising of liquid to a high level in standpipe 15 from which liquid can flow by gravity to the upper end of absorber coil 17 through conduit 16. The outlet end of the condenser 22 is connected by a conduit 30 to a part of the gas circuit, as at the upper end of the conduit 28, for example, so that any inert gas which may pass through the condenser 22 can flow into the gas circuit. Any unevaporated refrigerant at the outlet end of the higher temperature evaporator section 26 flows therefrom to the outer passage of the gas heat exchanger 25 through a conduit 29 formed as a liquid trap.

The refrigeration system is controlled by a thermal bulb 45 which is affected by a temperature condition of the higher temperature evaporator section 26. The thermal bulb 45, which is arranged to be influenced by the temperature of air which is cooled by the higher temperature evaporator section 26, is connected by a conduit 46 to a control device 47 operatively associated with a switch 37 connected in one of the conductors 48 for supplying electrical energy to electrical heating element 14'. The thermal bulb 45 and conduit 46 form part of an expansible fluid thermostat T which is charged with a suitable volatile fluid and responds to changes in a temperature condition affected by the higher temperature evaporator section 26 to operate control device 47 and the switch 37 operatively associated therewith to close and open the switch with increase and decrease, respectively, of the temperature of the air cooled by the higher temperature evaporator section 26.

The refrigerating effect produced by the upper evaporator section 24, which is adapted to be operated at temperatures substantially below freezing, is primarily utilized to effect cooling of an upper frozen food space 40a which is defined by a partition 49 and the thermally insulated walls of the cabinet 40. The refrigerating effect produced by the lower evaporator section 26, which is adapted to be operated at a higher temperature than that of evaporator section 24 and also desirably below freezing, is primarily utilized to cool air in an unfrozen food space 40b. A plurality of heat transfer fins 50 may be provided on the evaporator section 26 to promote cooling of air in the unfrozen food space 40b.

Frost accumulates on both the evaporator sections 24 and 26, such accumulation of frost taking place much more slowly in the upper space 40a than in the lower space because the need for gaining access into the former is considerably less than for the latter. If a layer of frost of considerable thickness were allowed to accumulate and form on the lower evaporator section 26, the efficiency of the refrigeration system would be reduced considerably and the system would operate for longer periods of time to maintain the unfrozen food space 40b at a desired low temperature than would otherwise be the case.

In order to defrost the evaporator section 26, refrigerant vapor expelled in vapor expulsion unit 42 and at an elevated temperature is conducted therefrom to the evaporator E in a path of flow which includes the pump 12, vapor space 31 of standpipe 15, upper part of conduit 19 and a by-pass vapor line 51 which by-passes the condenser 22 and includes conduit sections 32, 33, 34 and 35. By introducing hot expelled refrigerant vapor into the evaporator E the partial pressure of the refrigerant vapor in the evaporator increases and the temperature thereof will rise above the freezing temperature of water. In this manner the frost formed on the evaporator E is melted very rapidly by the hot vapor supplied thereto from generator 42 in a path of flow which by-passes the condenser 22.

The by-pass vapor line 51 is connected to a region 52 of the evaporator E at which inert gas partially enriched in refrigerant vapor and flowing from the upper evaporator section 24 is about to enter the lower evaporator section 26. The hot vapor introduced into the evaporator E at the region 52 mixes with inert gas which has been discharged from the upper evaporator section 24 and flows in parallel flow therewith into the lower evaporator section 26. With this arrangement it is possible to continue to store food at a safe refrigerating temperature in the frozen food space 40a. Also, defrosting of the lower evaporator section 26 can be effected sufficiently rapidly so that the temperature of the unfrozen food space 40b only increases a relatively small amount. In this way food can be stored in the space 40b at a safe refrigerating temperature during the interval of time the higher temperature evaporator section 26 is being defrosted.

In accordance with my invention the by-pass vapor line includes the conduit sections 32, 33, 34 and 35 which provides a path of flow for hot vapor from the vapor space 31 of the standpipe 15 to the region 52 of the higher temperature evaporator section 26. The conduit section 32 is connected to the vapor space 31 at a comparatively high point 36 so that the by-pass vapor line 51 leading to the evaporator E, which is generally positioned higher than the vapor-expulsion unit 42, will be short.

The conduit sections 32, 33 and 34 form a U-shaped trap 53 with the conduit section 32 forming one arm of the trap which extends downward from the point 36. Both the conduit section 32 and the conduit section 33, which forms the closed end of the trap 53, have an inner diameter which is sufficiently small so that vapor cannot freely pass through liquid in these conduit sections. To this end the inner diameters of the conduit sections 32 and 33 desirably should be less than 4.6 mm. The conduit section 34, which forms the other arm of the trap 53 and has an inner diameter greater than the inner diameters of the conduit sections 32 and 33, extends upward to a point 54 which is higher than the point 36 by a distance which is greater than the difference in the vertical height of the liquid levels I and II in the absorption solution circuit. The liquid level I is at the elevated horizontal section 18 of the liquid heat exchanger 11 which serves as an analyzer and into which expelled vapor flows at 43 from the vertical conduit 19. The liquid level II is the liquid surface level of the body of absorption solution held in the absorber vessel 10. By way of example, the liquid level I may be about 25 to 30 mm. lower than the liquid level II which, when related to the vertical level or zone of the heat conductive connection 9 of the heating tube 14 to the vapor-liquid lift pump 12, can be considered normal for the body of liquid in the absorber vessel 10. From the point 54 at the upper end of the conduit section 34 the conduit section 35 of the by-pass vapor line 51 slopes downward to the region 52 of the evaporator E at which it is connected thereto.

Since the conduit section 32, other than at the region 36 at which it is connected to the conduit 19 is spaced therefrom by a gap 55, the wall of the conduit section 32, and also the walls of the conduit sections 33 and 34, always are at a somewhat lower temperature than that of the vapor conduit 19 during operation of the refrigeration system and expelled vapor passing from the conduit 19 into the conduit sections 32, 33 and 34 condenses therein, such condensation taking place in accordance with what may be referred to as the "cold wall" principle. The condensate formed at the inner surfaces of the conduit sections 32, 33 and 34 collects in the U-shaped trap 53, so that hot vapor will no longer flow from the vapor conduit 19 to the lower evaporator section 26 through the vapor by-pass line 51.

When the refrigeration system is in an active or "on" period the vapor pressure prevailing in the vapor space 31 is higher than the vapor pressure in evaporator E. For this reason there will be a difference in the height of the liquid columns IV and III formed in the left and right hand arms 34 and 32, respectively, of the liquid trap 53, the liquid level IV being higher than the liquid level III. Hence, the conduit 34 desirably should be longer than the conduit 32 and of such vertical height that liquid cannot overflow therefrom into the conduit section 35 and flow to the evaporator E. Further, the vertical height of the conduit section 32 should be of such length from conduit section 33 to the point 36 that liquid collecting in the trap 53 will not overflow into the vapor conduit 19 during an active period of operation of the refrigeration apparatus.

Under normal conditions the difference in height between the liquid levels IV and III in the liquid trap 53 is somewhat greater than the difference in height between the liquid levels I and II in the absorption liquid circuit. It will now be understood that in an active period of operation of the system the liquid seal formed in the trap 53 prevents flow of expelled generator vapor through the by-pass line 51 to the evaporator E. And, under these conditions, the liquid level IV in the left arm of the trap 53 always is higher than the liquid level III in the right arm thereof by the same amount that the liquid level II in the absorber vessel 10 is higher than the liquid level I in the horizontal part 18 of the liquid heat exchanger 11.

When the expansible fluid thermostat operates to open the switch 37 and deenergize the electrical heating element 14', the supply of heat to the vapor-expulsion unit 42 is reduced and stops. When this occurs the pressures in the vapor space 31 and in the evaporator E, and also the pressures in the conduits 19 and 20 at the analyzer 18, at first will become the same and equal. With cessation of heat supply to the vapor-expulsion unit or generator 42, the parts of which are at a much higher temperature than the ambient air, the temperature of these components of the system will decrease slowly. Hence, the partial pressure of refrigerant vapor in the vapor space 31 will decrease without a corresponding change in pressure in the evaporator E.

Consequently, the pressure prevailing in the inert gas circuit, of which the evaporator E forms a part, will force liquid in the trap 53 to flow upward through the right arm or conduit section 32 into the vapor conduit 19 of the vapor-expulsion unit 42. Such flow of liquid into conduit 19 will cause the liquid levels in the conduits 19 and 20 to rise further. Since the body of absorption solution held in the absorber vessel has a large cross-sectional area, the introduction of liquid into the conduit 19 in the manner just explained will not cause the liquid level II in the absorber vessel 10 to rise to any significant extent. It should be understood that the absorption liquid circuit, of which the absorber vessel 10 and coil 17 form components, inherently functions to provide an effective seal which prevents inert gas in the inert gas circuit from passing into the vapor-expulsion unit 42 and the vapor spaces thereof. Therefore, the inert gas cannot reduce and equalize the differences in pressures between the evaporator E and vapor space 31.

The vapor space 31 and evaporator E also are connected by the conduit 20, rectifier 21 and condenser 22. But this connection also includes the analyzer 18 which is a part of the absorption solution circuit and maintains a liquid seal between the vapor space 31 and evaporator E. Hence, only the vapor by-pass line 51 can provide a path of flow for fluid between the vapor space 31 and evaporator E to equalize the pressures in these parts of the refrigeration system. During the active or "on" period of operation of the system, the vapor pressure in the vapor space 31 is higher than the pressure in the evaporator E, as explained above. But when the supply of heat to the generator or vapor-expulsion unit 42 is stopped, this condition is reversed. The liquid column in the arm 34 of the liquid trap 53 is acted upon by the vapor pressure prevailing in the evaporator E which depresses this liquid column and forces liquid to flow from the right arm 32 into the vapor conduit 19. Since this liquid is condensed refrigerant, the region 36 at which the liquid trap arm 32 is connected to the vapor space 31 should be located at such a place in the vapor-expulsion unit 42 that liquid displaced from the arm 32 will be introduced into the absorption liquid circuit in a part thereof in which absorption solution enriched in refrigerant is present. After liquid has been displaced from the left trap arm 34, vapor and inert gas from the evaporator E will be capable of forcing the liquid remaining in the right arm 32 upward into the conduit 19 because the internal diameter of this arm is sufficiently small so that vapor cannot freely pass liquid therein and it will function in the same manner as the vapor-liquid lift pump 12. Removal of all of the liquid in the trap 53 will occur when the interval of time the heating element 14' is deenergized by the action of the thermostat T is sufficiently long.

When all of the liquid in the trap 53 is removed in the manner just explained, the pressures in the vapor space 31 and evaporator E will be equal. The liquid levels in the conduits 19 and 20 will now reach a vertical height which is the same as the liquid level II in the absorber vessel 10. When the electrical heating element 14' again becomes energized by the action of the thermostat T and heat is supplied to the refrigeration system the vapor by-pass line 51 will be open. Hence, hot vapor in the vapor space 31 of the vapor expulsion unit 42 can flow through the by-pass line directly to the lower evaporator section 26 so as to melt frost accumulated thereon. When hot vapor from the generator or vapor-expulsion unit 42 flows through the conduit sections 32, 33 and 34, condensation also takes place at the inner wall surfaces thereof in accordance with the "cold wall" principle referred to above.

After an interval of time within which defrosting of the lower evaporator section 26 has been completed, the condensate in the trap 53 eventually forms a liquid seal which builds up rapidly. When the difference in height of the liquid levels in the arms 32 and 34 becomes greater than the difference in height of the liquid levels I and II in the absorption solution circuit, the hot generator vapor no longer can flow from the vapor space 31 through the by-pass line 51 and will now flow downward in the vapor conduit 19 through the liquid head in the analyzer 18, conduit 20 and rectifier 21 into the condenser 22 in which the refrigerant vapor is liquefied. The liquid refrigerant then flows through conduit 23 to the evaporator E to produce useful refrigeration in the latter in the manner explained above.

The generator or vapor expulsion unit 42 in its entirety, together with a major portion of the liquid heat exchanger 11, are embodied in a body of insulation material, diagrammatically illustrated at 56, which may be retained in a metal shell or casing (not shown) having an opening at the bottom thereof. The heating tube 14 desirably is embedded in a part of the insulating material 56 which is spaced from the top and bottom ends thereof. The electrical heating element 14' is arranged to be positioned within the heating tube 14 through the bottom opening in the shell. The body of insulating material 56 reduces radiation heat losses and conserves heat with a temperature gradient in an outward direction from its center portion.

By locating the conduit sections 32, 33 and 34 of the vapor by-pass line 51 in a cooler or warmer place in the body of insulating material 56, the length of the defrosting periods can be lengthened or shortened for the reason that condensation of vapor in the by-pass line 51 and the eventual formation of a liquid seal in the trap 53, which terminates a defrosting period, can be accelerated or delayed. The length of the defrosting periods can also be affected by varying the length of the left arm 34 of the trap 53 so that more or less condensation takes place at the inner wall surface thereof.

In some instances the thermostat T performs in such a way that the heating element 14' is deenergized for comparatively short intervals of time. Under these conditions it is possible that the pressure in the vapor expulsion unit or generator 42 will not decrease sufficiently for all of the liquid to be displaced from the liquid trap 53 in the manner explained. This can be corrected by adjusting the thermostat T so that the periods of cessation or reduction of heat to the refrigeration system are lengthened to insure that complete defrosting is effected. If the thermostat is not properly adjusted some frost may accumulate on the evaporator E.

However, this frost will be melted automatically in the manner explained above when normal thermostat operation is established. It will be understood that when a conventional thermostat is set for the refrigeration system to produce maximum cooling it becomes inoperable to disconnect the heating element 14' from the source of electrical supply. Under these conditions the refrigeration system will not cycle between active or "on" periods and inactive or "off" periods and defrosting cannot be effected in the manner explained above.

The conduit section 35 of the by-pass line 51 slopes downward to the region 52 of the evaporator E. When defrosting is taking place condensation takes place at the inner wall of this conduit and such condensate flows to the evaporator E. The form of the conduit section 35 can be modified so that a greater or smaller part thereof slopes downward toward the bottom of the liquid trap 53. This will shorten the time for sufficient liquid to collect in the trap 53 to seal the vapor by-pass line 51. Further, the length of the defrosting periods can be shortened by locating the U-shaped trap 53, and particularly the left arm 34 thereof, either in a cooler place in the body of insulating material 56 or exteriorly thereof.

When the inner diameters of the right arm 32 of the liquid trap 53 and the pump pipe 12 are the same, the trap as a rule will be almost completely depleted of liquid each time the pressure differential in the vapor space 31 and evaporator E is sufficient to displace liquid from the trap. Subsequent defrosting periods will then be of approximately equal duration because, when each such period is initiated, the length of time it takes for condensate to fill the liquid trap 53 will be the same. When the thermostat T performs under such operating conditions that the alternating "on" and "off" periods of operation are frequent and relatively short, it is possible that the "off" periods will be extremely short so that the pressure in the vapor space 31 cannot fall sufficiently to remove liquid from the trap 53 in the manner explained above.

The conduit sections 32, 33, 34 and 35 of the vapor by-pass lines 51 can be formed from a single length of pipe having the same internal diameter which is the same as that of the conduit section 34, as described above. During an active or "on" period of operation of the refrigeration system when the pressure in the vapor space 31 is relatively high, the vapor in the space 31 will act on the liquid column in the right arm 32 of the trap and increase the length of the liquid column in the left arm 34. Under these conditions the height of the right arm 32 desirably should be small. When the pressure in the vapor space 31 is reduced and less than the pressure in the evaporator E inert gas and vapor in the latter will act on the liquid column in the arm 34 so that a large part of the body of liquid in the trap 53 will be displaced from the arm 32 into the conduit 19. Even when all of the liquid is not removed from the trap 53 the amount of liquid remaining in the trap will be insufficient to prevent defrosting from being initiated when the thermostat T again connects the heating element 14' to the source of electrical supply. However, the liquid remaining in the trap 53 when defrosting is initiated plus the liquid collecting in the trap due to condensation of refrigerant vapor will shorten the length of the defrosting period compared to the length of the defrosting periods initiated following complete removal of liquid from the trap. Hence, the length of the defrosting periods under the conditions just discussed will depend on the length of the right arm 32 of the trap 53.

It has been explained that my improvement for defrosting the refrigeration system shown in the drawing and described above makes use of the cycling of the refrigeration system to automatically start defrosting each time an "on" or active period commences following an "off" or inactive period. It should now be understood that in an inactive period the supply of heat to the generator or expulsion unit 42 is reduced, whereby its temperature falls sufficiently so that the pressure in the vapor space 31 becomes less than the pressure of vapor and inert gas in the evaporator E. As explained above, this forces liquid out of the trap 53 through the right arm 32.

In the preferred embodiment shown and described the thermostat control T operates to open and close the switch 37 to respectively disconnect and connect the electrical heating element 14' from and to the source of electrical supply. Hence, the supply of heat to the vapor expulsion unit 42 is reduced by shutting off the heating element 14'. However, the switch 37 and the heating means may be of a type which functions to reduce the supply of heat to the expulsion unit 42 by the heating element 14' instead of disconnecting the latter from the source of electrical supply. The supply of heat to the vapor expulsion unit 42 under these conditions still has to be reduced sufficiently for the pressure in the vapor space 31 to fall below the pressure of vapor and inert gas in the evaporator. Therefore, the term or expression "inactive period" in the cycling of the refrigeration system, as used in the specification and in the claims, is intended to cover those periods in the operation of the refrigeration system in which the heat supply to the vapor expulsion unit either is cut off or reduced sufficiently for the pressure in the vapor space 31 to fall below the pressure of vapor and inert gas in the evaporator E and cause liquid to be removed from the trap 53 into the conduit 19 in the manner explained above.

When a gaseous fuel burner is employed to heat the vapor expulsion unit 42 in place of the electrical heating element 14', the switch 37 often is replaced by a valve which permits some fuel to flow to the burner when the thermostat T operates to cycle the operation of the refrigeration system and reduce the rate at which fuel is supplied to the burner to initiate an inactive period of the system. This is done to prevent the burner flame from being extinguished during an inactive period in which heat of liquid is supplied to the absorption solution or sufficient heat is supplied to expel vapor from solution and effect some circulation of absorption solution in its circuit. However, so long as the pressure in the vapor space 31 is below the pressure of vapor and inert gas in the evaporator E the supply of heat to the vapor expulsion unit by the burner has been reduced sufficiently to establish an inactive period of the refrigeration system.

The defrosting arrangement embodying my invention is extremely flexible so that defrosting can be effected at intervals of a couple of hours or one or more times in a single hour. The parts of the refrigeration system can be so disposed that defrosting can be effected by transferring vapor at an elevated temperature of about 80° to 100° C through the by-pass line 51 from the vapor space 31 to the lower section 26 of the evaporator E for intervals of time ranging from 30 to 90 seconds.

Refrigeration systems embodying my invention have been operated with the higher temperature evaporator section 26 practically free of frost and without adversely affecting the temperature of the unfrozen food space 40b more than half a degree Centigrade. This is less than the adverse effect of other factors, such as the intermittent opening and closing of the refrigerator door and placing of warm food in the food space. In view of the efficiency of my improved defrosting arrangement, the overall energy or power requirements of a refrigerator embodying my invention will be less than that for a refrigerator not equipped to provide defrosting or for a refrigerator in which defrosting is effected by a separate heater.

Further, my improved defrosting arrangement provides a completely automatic defrosting control which forms a part or component of the hermetically sealed refrigeration system and is operable responsive to an operating condition of the system. The defrosting arrangement is such that it is self-starting each time an "on" or active period of the refrigeration system commences following an inactive or "off" period and also will automatically terminate of its own accord after an interval of time.

I claim:

1. An absorption refrigeration system of the inert gas type comprising
  a. a circuit for circulation of inert gas including an absorber and an evaporator subject to formation of frost,
  b. a circuit for circulation of absorption solution including said absorber and a vapor-expulsion unit, said last-mentioned circuit having conduit means for conducting solution enriched in refrigerant from said absorber to said vapor-expulsion unit, said conduit means including a part which serves as an analyzer and has a first liquid seal formed by a column of solution therein,
  c. a source of heat external to the system for heating said vapor-expulsion unit to expel vapor from solution therein,
  d. means for controlling said source of heat to increase and decrease the heating of said vapor-expulsion unit,
  d'. a condenser,
  e. means comprising a first conduit connection including said analyzer for conducting expelled vapor from the vapor space of said vapor-expulsion unit to said condenser and for conducting condensate from the latter to said evaporator for evaporation therein in the presence of inert gas to produce refrigeration,
  f. the expelled vapor being forced through the liquid column of said first liquid seal when expelled vapor is being conducted through said first conduit connection and said evaporator is producing refrigeration,
  g. means comprising a second conduit connection by-passing said condenser for conducting expelled vapor at an elevated temperature from the vapor space of said vapor-expulsion unit to said evaporator to melt frost thereon, said second conduit connection having a downwardly extending portion communicating with the vapor space of said vapor-expulsion unit and an upwardly extending portion communicating with said evaporator, said downwardly and upwardly extending portions defining a trap in which a second liquid seal is formed by vaporous fluid condensed therein,
  h. said first and second conduit connections and said first and second liquid seals respectively formed therein being so constructed and arranged that the relative heights of the liquid columns at said seals are dependent upon the difference in pressure developed in the vapor space of said vapor-expulsion unit and the pressure developed in the vapor space of said evaporator, and
  i. structure comprising said first and second conduit connections for changing the difference in pressure developed in the vapor space of said vapor-expulsion unit and the pressure developed in the vapor space of said evaporator when heating of said vapor-expulsion unit by said source of heat is changed by said control means to (1) effect opening of said second liquid seal in said second conduit connection and to (2) enable expelled vapor at an elevated temperature to flow therethrough and by-pass said condenser to melt frost on said evaporator.

2. An absorption refrigeration system as set forth in claim 1 in which the inner diameter of said downwardly extending portion of said trap of said second conduit connection, due to change in the difference in pressure developed in the vapor space of said vapor-expulsion unit and the vapor space of said evaporator which is sufficient to open said second liquid seal, is sufficiently small so that vapor cannot freely pass liquid therein and liquid will be forced out of said trap by the vapor.

3. An absorption refrigeration system as set forth in claim 1 in which said absorber comprises a looped coil and a vessel into which absorption solution flows by gravity from said coil, and in which the difference in height between the region at which the downwardly extending portion of said second conduit connection communicates with the vapor space of said vapor-expulsion unit and the bottom of the trap formed by said downwardly and upwardly extending portions in said second conduit connection is greater than the difference in height between the liquid surface level in said absorber vessel and the liquid level in said analyzer at the region thereof at which expelled vapor from said vapor space is introduced.

4. An absorption refrigeration system as set forth in claim 1 in which said absorber comprises a looped coil and a vessel into which absorption solution flows by gravity from said coil, and in which the upper end of said upwardly extending portion of said second conduit connection is at a level higher than that of the upper end of said downwardly extending portion of said second conduit connection by a vertical height which is greater than the difference in height between the liquid surface level in said absorber vessel and the liquid level in said analyzer at the region thereof at which expelled vapor from said vapor space is introduced.

5. An absorption refrigeration system as set forth in claim 1 in which said absorber comprises a looped coil and a vessel into which absorption solution flows by gravity from said coil, and in which the difference in height between the region at which the downwardly extending portion of said second conduit connection communicates with the vapor space of said vapor-expulsion unit and the bottom of the trap formed by said downwardly and said upwardly extending portions in said second conduit connection is greater than the difference in height between the liquid surface level in said absorber vessel and the liquid level in said analyzer at the region thereof at which expelled vapor from said vapor space is introduced, and in which the upper end of said upwardly extending portion of said second conduit connection is at a level higher than that of the upper end of said downwardly extending portion of said second conduit connection by a vertical height which is greater than the difference in height between the liquid surface level in said absorber vessel and the liquid level in said analyzer at the region thereof at which expelled vapor from said vapor space is introduced.

6. An absorption refrigeration system as set forth in claim 5 in which the inner diameter of said downwardly extending portion of said second conduit connection is at least as large as the inner diameter of said upwardly extending portion of said second conduit connection.

7. An absorption refrigeration system as set forth in claim 6 in which the inner diameter of said downwardly extending portion is sufficiently small so that vapor cannot freely pass liquid therein and liquid will be forced out of said trap by the vapor.

8. An absorption refrigeration system as set forth in claim 1 in which said vapor-expulsion unit is heated intermittently and said system cycles between "on" or active periods and "off" or inactive periods when heating of said unit by said source of heat is respectively increased and decreased by said control means, said structure for changing the difference in pressure developed in the vapor space of said vapor-expulsion unit and the pressure developed in the vapor space of said evaporator becoming (1) operable to effect opening of said second liquid seal in said second conduit connection at the beginning of an "off" or inactive period and becoming (2) operable for expelled vapor at an elevated temperature to flow therethrough and by-pass said condenser to defrost said evaporator at the start of an "on" or active period and terminate such defrosting during said active period after a sufficient quantity of vaporous fluid condenses in said trap and forms said second liquid seal.

9. An absorption refrigeration system as set forth in claim 8 in which said means for controlling said source of heat increases and decreases the heating of said vapor-expulsion unit responsive to a temperature condition affected by said evaporator.

10. An absorption refrigeration system of the inert gas type comprising
  a. a circuit for circulation of inert gas including an absorber and an evaporator subject to formation of frost, said absorber including a looped coil and a vessel into which absorption solution flows by gravity from said coil,
  b. a circuit for circulation of absorption solution including said absorber and a vapor-expulsion unit, said last-mentioned circuit having conduit means for conducting solution enriched in refrigerant from said absorber to said vapor-expulsion unit, said conduit means including a part which serves as an analyzer and has a first liquid seal formed by a column of solution therein,
  c. a source of heat external to the system for heating said vapor-expulsion unit to expel vapor from solution therein,
  d. a condenser,
  e. means comprising a first conduit connection including said analyzer for conducting expelled vapor from the vapor space of said vapor-expulsion unit to said condenser and for conducting condensate from the latter to said evaporator for evaporation there in the presence of inert gas to produce refrigeration,
  f. the expelled vapor being forced through the liquid column of said first liquid seal when expelled vapor is being conducted through said first conduit connection and said evaporator is producing refrigeration,
  g. means comprising a second conduit connection by-passing said condenser for conducting expelled vapor at an elevated temperature from the vapor space of said vapor-expulsion unit to said evaporator to melt frost thereon, said second conduit connection having a downwardly extending portion communicating with the vapor space of said vapor-expulsion unit and an upwardly extending portion communicating with said evaporator, said downwardly and upwardly extending portions defining a trap in which a second liquid seal is formed by vaporous fluid condensed therein,
  h. the difference in height between the region at which the downwardly extending portion of said second conduit connection communicates with the vapor space of said vapor-expulsion unit and the bottom of the trap formed by said downwardly and upwardly extending portions in said second conduit connection being greater than the difference in height between the liquid surface level in said absorber vessel and the liquid level in said analyzer at the region thereof at which expelled vapor from said vapor space is introduced, and
  i. the upper end of said upwardly extending portion of said second conduit connection being at a level higher than that of the upper end of said downwardly extending portion of said second conduit connection by a vertical height which is greater than the difference in height between the liquid surface level in said absorber vessel and the liquid level in said analyzer at the region thereof at which expelled vapor from said vapor space is introduced.

* * * * *